(Model.)
F. H. HOWES.
NUT LOCK.
No. 341,145. Patented May 4, 1886.
2 Sheets—Sheet 1.
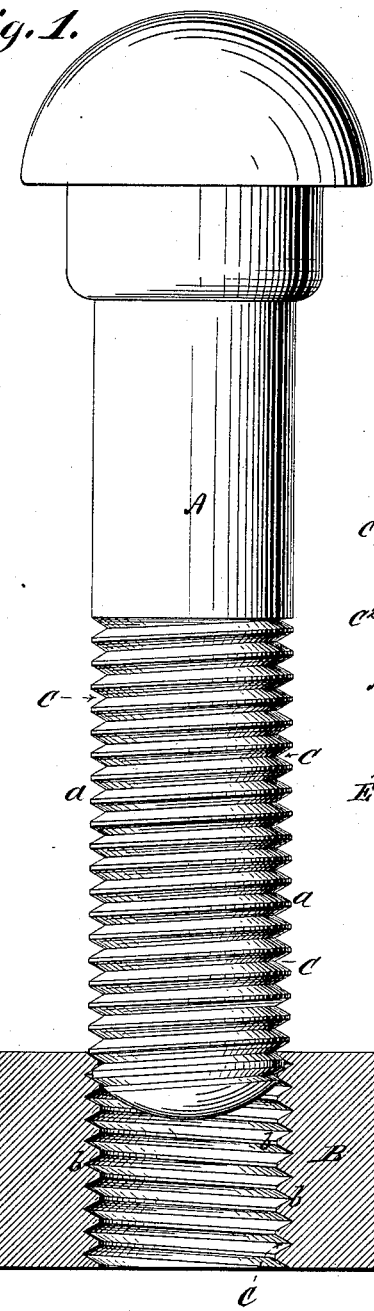
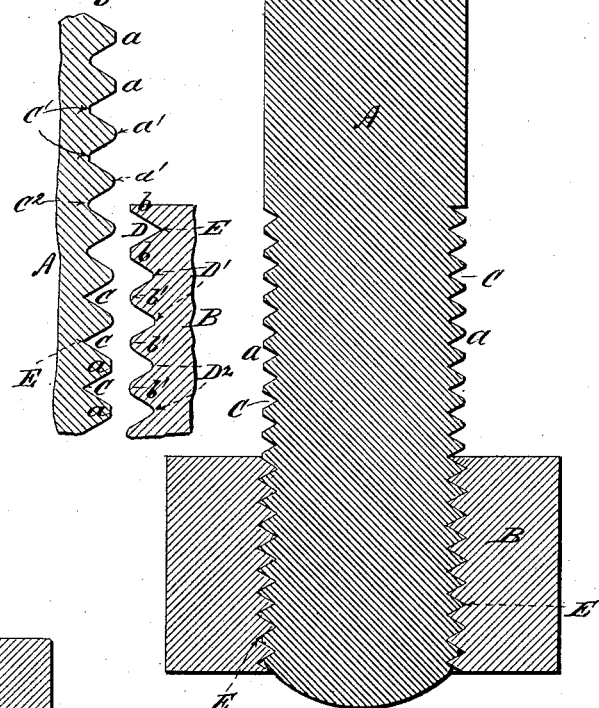
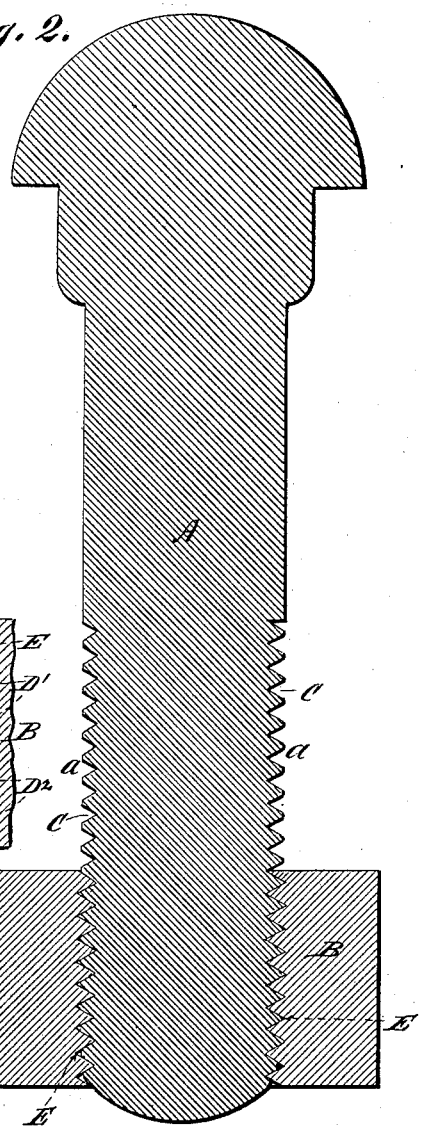
Witnesses:
M. L. Adams.
R. C. Howes.
Inventor:
Frank H. Howes,
Per Edw. E. Lumly,
Atty.

(Model.)
F. H. HOWES.
NUT LOCK.
No. 341,145. Patented May 4, 1886.
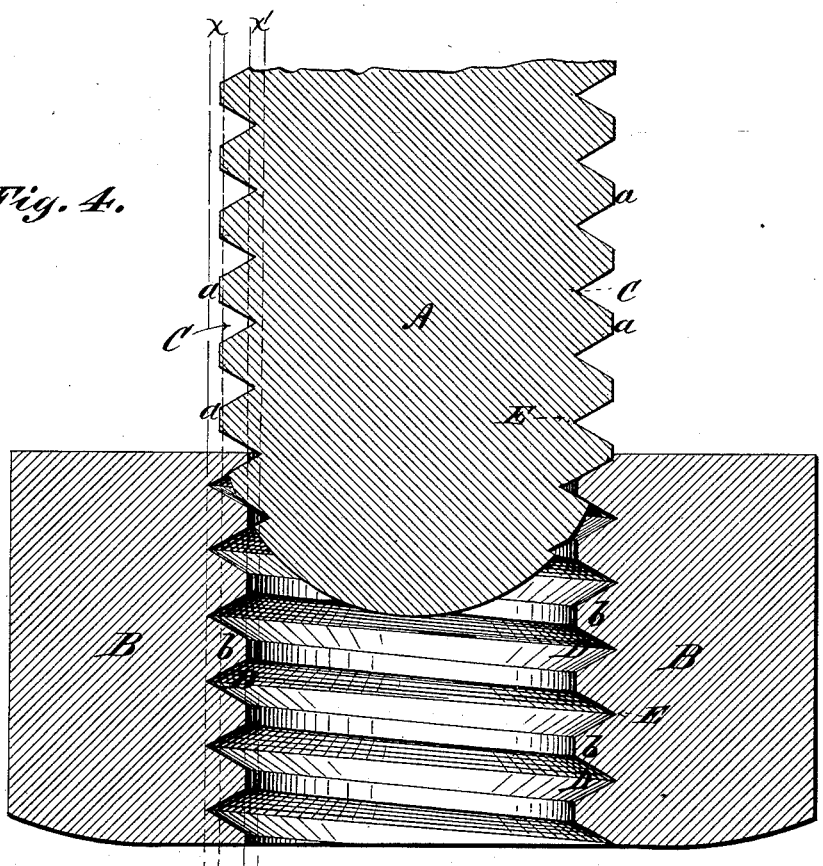
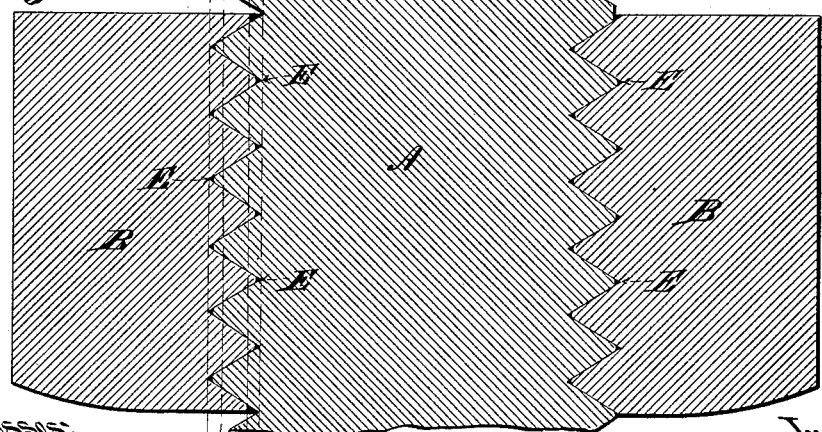

UNITED STATES PATENT OFFICE.

FRANK H. HOWES, OF EAST ORANGE, NEW JERSEY.

NUT-LOCK.

SPECIFICATION forming part of Letters Patent No. 341,145, dated May 4, 1886.

Application filed November 18, 1885. Serial No. 183,157. (Model.)

*To all whom it may concern:*

Be it known that I, FRANK H. HOWES, of East Orange, New Jersey, have invented a certain Improvement in Bolts and Nuts, of which the following is a specification.

This improvement relates to the type of bolts and nuts having screw-threads relatively so proportioned as to conflict with and abrade each other when the nut is applied to the bolt, and to thereby cause the nut to acquire a firm grip upon the bolt. This result has heretofore been attained by the employment in the bolt and nut of threads of different pitches, and also by the employment of threads differing in the angles of their sides of the contour of their cross-sections either from each other or from the grooves which they are intended to engage, and it is a result which has also in a measure been produced whenever a tight-fitting nut has been applied to a bolt.

The present invention consists in the employment, in a bolt and nut, respectively, of screw-threads which are truncated or rounded upon their apices, and which are alike in the angles of their sides and in the contour of their cross-sections, and which are in a prescribed degree wider than the portions of the grooves in which they are respectively to be contained, the remaining portions or bottoms of the grooves presenting cavities for the reception of the metal upset by the pressure of the sides of the threads upon each other.

The accompanying drawings, illustrating a bolt and nut embodying the invention, are as follows:

Figure 1 is an elevation of the bolt, showing it just entered into a nut, which is represented in axial section. Fig. 2 is an axial section of a bolt and nut, illustrating the effect of the complete application of the nut to the bolt. Fig. 3 is a longitudinal section of portions of a bolt and a nut, illustrating modifications in the forms of the threads in cross-section. Fig. 4 is an axial section upon a large scale, showing the end portion of the bolt just entering the nut; and Fig. 5 is a similar section showing the nut and portion of the bolt in full engagement.

The drawings represent a bolt, A, provided with a truncated screw-thread, $a$, or with a thread having a rounded apex, $a'$. The sides of the thread have the usual angle of sixty degrees. The nut B is also provided with a truncated thread, $b$, or with a thread having the rounded apex $b'$. The bolt is provided either with the V-shaped groove C, or the groove may have the flat or rounded bottom $C'$ or $C^2$. Similarly the nut may have the V-shaped groove D or the flat or round-bottomed groove $D'$ or $D^2$. In either case the groove is made sufficiently deep to present at the bottom the cavity E for the reception of the metal displaced by the pressure of the sides of the threads upon each other in the act of applying the nut to the bolt.

The difference between the thickness of any part of the thread and the corresponding part of the groove by which it is to be engaged will of course be varied according to the kind of metal which is employed, and also according to the size of the bolt and nut. In any case the dimensions of the cavities E at the bottom of the grooves must be proportioned with reference to affording room for the flow of the quantity of metal upset by the act of applying the nut to the bolt. By the observance of this rule the proportions will readily be arrived at in practice by those skilled in the manufacture of ordinary bolts and nuts.

It will be seen, as illustrated in Fig. 4, that in applying the nut to the bolt the conflict of the threads does not begin until the bolt has been turned nearly one complete revolution upon its axis after its first engagement with the nut. At the extreme end of the bolt the thread is incomplete, and it is not until the bolt is so far turned as to bring the complete thread of the bolt into engagement with the nut that the pressure of the sides of the threads upon each other begins. As the rotating movement progresses the extent of pressure, of course, increases, but with such progression there is increased hold of the nut-threads upon the bolt-threads, which is sufficient to maintain the continued engagement of the nut with the bolt, and to effect the upsetting and flow of metal into the cavities provided for its receptions at the bottoms of the grooves approximately, as illustrated in Fig. 5, and by the dotted lines x x and x' x' intersecting both Figs. 4 and 5.

What is claimed as the invention is—

A bolt and nut provided with screw-threads of like pitch and like angles upon their sides, but of greater thickness than the width of the portions of the grooves in which they are to be engaged, and provided with grooves of sufficient depth to afford at their bottoms cavities for the reception of the metal upset by the pressure of the sides of the threads upon each other in the act of applying the nut to the bolt.

FRANK H. HOWES.

Witnesses:
R. C. HOWES,
M. L. ADAMS.